(12) United States Patent
Strock et al.

(10) Patent No.: US 8,506,243 B2
(45) Date of Patent: Aug. 13, 2013

(54) SEGMENTED THERMALLY INSULATING COATING

(75) Inventors: Christopher W. Strock, Kennbunk, ME (US); Gene Buchina, Sanford, ME (US); Susan M. Tholen, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 650 days.

(21) Appl. No.: 12/621,557

(22) Filed: Nov. 19, 2009

(65) Prior Publication Data

US 2011/0116920 A1 May 19, 2011

(51) Int. Cl.
*F01D 25/24* (2006.01)
(52) U.S. Cl.
USPC ............... 415/173.1; 415/173.4; 416/224; 416/241 B
(58) Field of Classification Search
USPC ............ 415/134, 135, 173.1, 173.4, 174.4; 416/224, 241 R, 241 B; 427/446, 376.2, 427/596
See application file for complete search history.

(56) References Cited

U.S. PATENT DOCUMENTS

| 4,273,824 | A | | 6/1981 | McComas et al. |
|---|---|---|---|---|
| 4,639,388 | A | | 1/1987 | Ainsworth et al. |
| 4,914,794 | A | | 4/1990 | Strangman |
| 5,057,379 | A | | 10/1991 | Fayeulle et al. |
| 5,064,727 | A | | 11/1991 | Naik et al. |
| 5,419,971 | A | | 5/1995 | Skelly et al. |
| 5,609,921 | A | | 3/1997 | Gitzhofer et al. |
| 5,681,616 | A | * | 10/1997 | Gupta et al. .................. 427/264 |
| 5,705,231 | A | | 1/1998 | Nissley et al. |
| 5,723,078 | A | * | 3/1998 | Nagaraj et al. ............. 264/36.18 |
| 6,102,656 | A | | 8/2000 | Nissley et al. |
| 6,251,526 | B1 | | 6/2001 | Staub |
| 6,316,078 | B1 | * | 11/2001 | Smialek ........................ 428/141 |
| 6,358,002 | B1 | | 3/2002 | Good et al. |
| 6,503,574 | B1 | * | 1/2003 | Skelly et al. .................. 427/446 |
| 6,652,227 | B2 | * | 11/2003 | Fried .......................... 415/173.4 |
| 6,846,574 | B2 | | 1/2005 | Subramanian |
| 6,884,384 | B2 | | 4/2005 | Merrill et al. |
| 7,112,758 | B2 | | 9/2006 | Ma et al. |
| 7,334,985 | B2 | * | 2/2008 | Lutjen et al. ............... 415/173.1 |
| 7,563,503 | B2 | | 7/2009 | Gell et al. |
| 7,955,708 | B2 | * | 6/2011 | Doesburg et al. ............. 428/472 |
| 2001/0004436 | A1 | | 6/2001 | Chasripoor |
| 2003/0054108 | A1 | * | 3/2003 | Beele .......................... 427/376.2 |

(Continued)

FOREIGN PATENT DOCUMENTS

| EP | 2233803 | 9/2010 |
|---|---|---|
| GB | 2272453 | 5/1994 |

OTHER PUBLICATIONS

Trice, et al.: "Column Formation in Suspension Plasma-Sprayed Coatings and Resultant Thermal Properties," Journal of Thermal Spray Technology, ASM International, 42 pp.

(Continued)

*Primary Examiner* — Edward Look
*Assistant Examiner* — Liam McDowell
(74) *Attorney, Agent, or Firm* — Carlson, Gaskey & Olds, P.C.

(57) ABSTRACT

A gas turbine article includes a substrate, a plurality of geometric surface features that protrude from the substrate, and a thermally insulating topcoat disposed over the plurality of geometric surface features. The thermally insulating topcoat includes segmented portions that are separated by faults that extend through the topcoat from the geometric surface features.

25 Claims, 3 Drawing Sheets

(56) References Cited

U.S. PATENT DOCUMENTS

| | | | |
|---|---|---|---|
| 2005/0266163 A1* | 12/2005 | Wortman et al. | 427/248.1 |
| 2006/0222777 A1 | 10/2006 | Skoog et al. | |
| 2009/0280298 A1 | 11/2009 | Rosenzweig et al. | |
| 2011/0151219 A1 | 6/2011 | Nagaraj et al. | |

OTHER PUBLICATIONS

U.S. Appl. No. 13/307,295, filed Nov. 30, 2011 Entitled "Segmented Thermally Insulating Coating".

Search Report and Written Opinion mailed on Feb. 11, 2011.

* cited by examiner

SEGMENTED THERMALLY INSULATING COATING

BACKGROUND

This disclosure relates to protective thermally insulating coatings having enhanced heat resistance.

Components that are exposed to high temperatures, such as a component within a gas turbine engine, typically include protective coatings. For example, components such as turbine blades, turbine vanes, blade outer air seals, and compressor components typically include one or more coating layers that function to protect the component from erosion, oxidation, corrosion or the like to thereby enhance component durability and maintain efficient operation of the engine.

As an example, some conventional turbine blade outer air seals include an abradable ceramic coating that contacts tips of the turbine blades such that the blades abrade the coating upon operation of the engine. The abrasion between the outer air seal and the blade tips provide a minimum clearance between these components such that gas flow around the tips of the blades is reduced to thereby maintain engine efficiency. Over time, internal stresses can develop in the protective coating to make the coating vulnerable to erosion and spalling. The outer air seal may then need to be replaced or refurbished after a period of use.

SUMMARY

An exemplary turbine article includes a substrate, a plurality of geometric surface features that protrude from the substrate, and a thermally insulating topcoat disposed over the plurality of geometric surface features. The thermally insulating topcoat includes segmented portions that are separated by faults that extend through the topcoat from the geometric surface features. The turbine article may be a blade outer air seal in a gas turbine engine.

An exemplary method of processing a turbine article includes depositing a thermally insulating topcoat over a plurality of geometric surface features that protrude from a substrate such that the thermally insulating topcoat forms with faults that extend through the thermally insulating topcoat from the plurality of geometric surface features to separate segmented portions of the thermally insulating topcoat.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
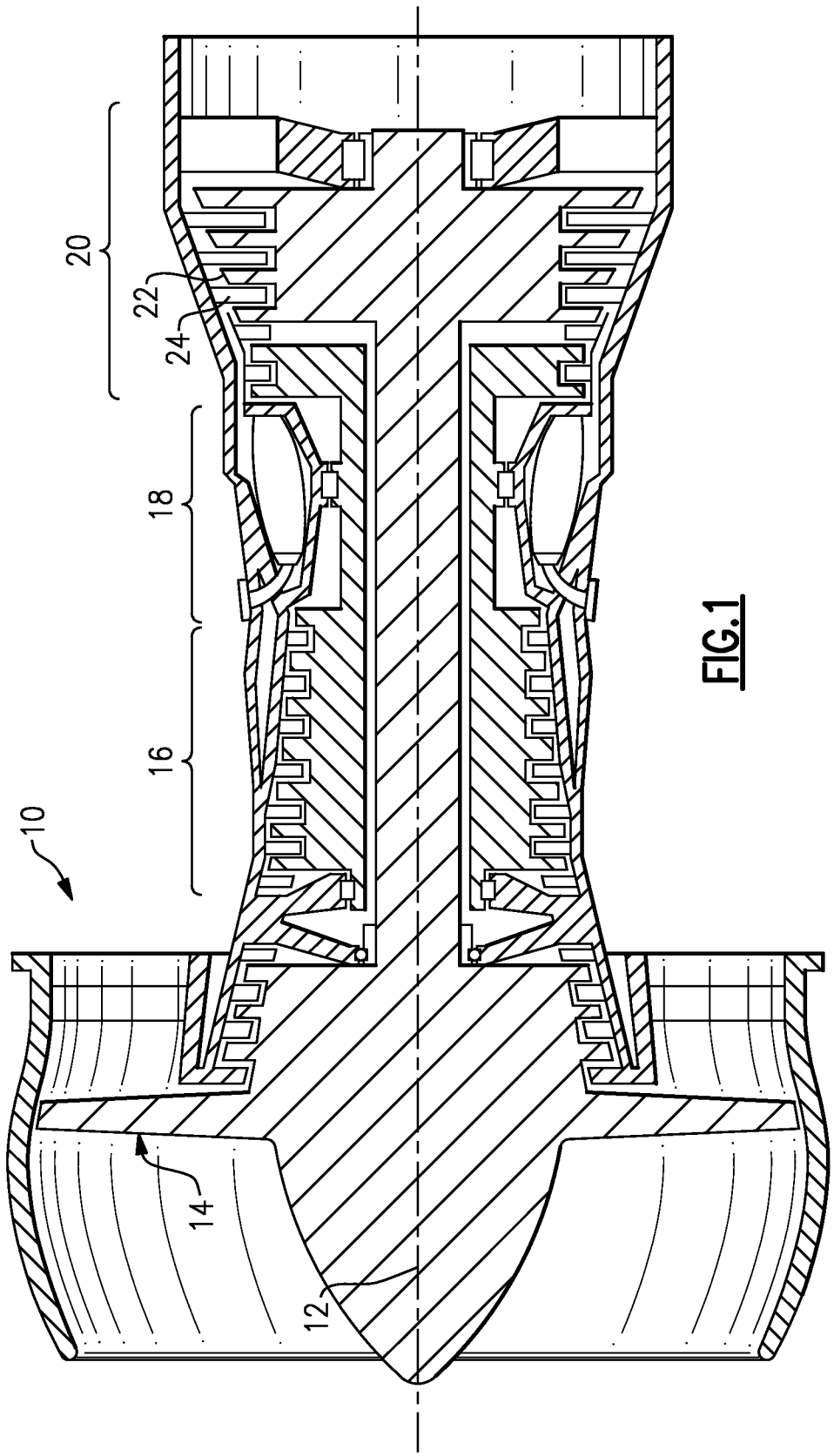
FIG. 1 illustrates an example turbine engine.

FIG. 1 illustrates selected portions of an example gas turbine engine 10, such as a gas turbine engine 10 used for propulsion. In this example, the gas turbine engine 10 is circumferentially disposed about an engine centerline 12. The engine 10 may include a fan 14, a compressor 16, a combustion section 18, and a turbine section 20 that includes rotating turbine blades 22 and static turbine vanes 24. It is to be understood that other types of engines may also benefit from the examples disclosed herein, such as engines that do not include a fan or engines having other types of compressors, combustors, and turbines than shown.

Figure 2:
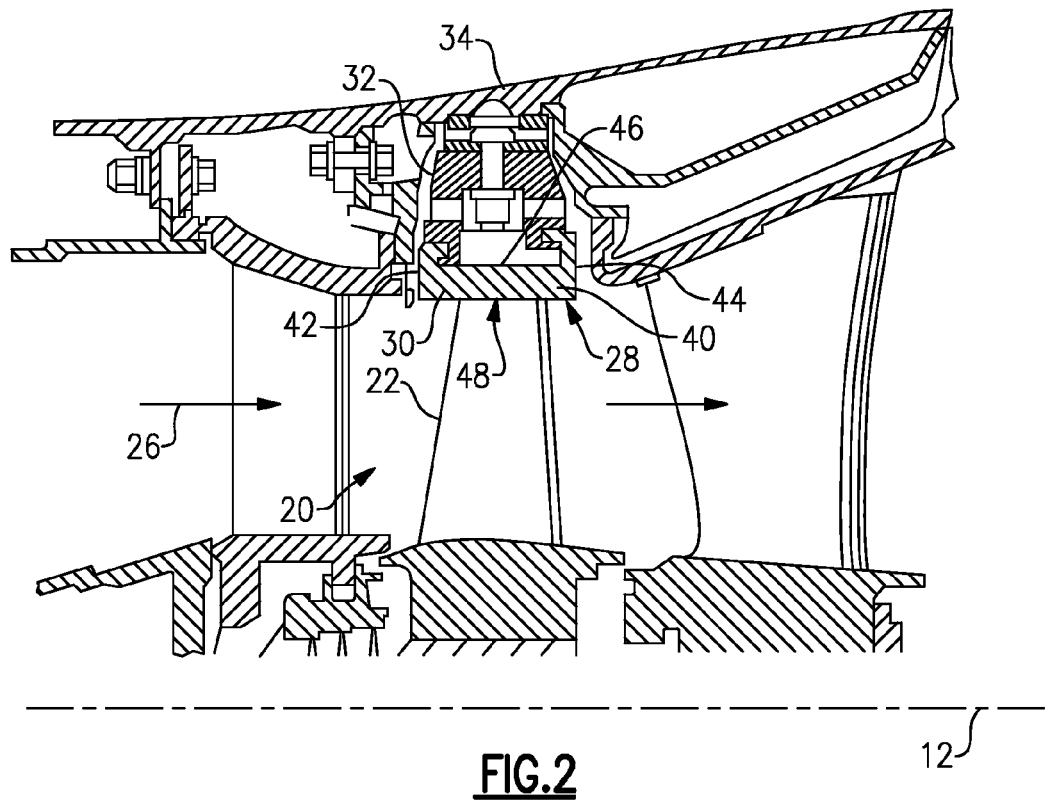
FIG. 2 illustrates a turbine section of the turbine engine.

FIG. 2 illustrates selected portions of the turbine section 20. The turbine blades 22 receive a hot gas flow 26 from the combustion section 18 (FIG. 1). The turbine section 20 includes a blade outer air seal system 28, having a plurality of seal members 30, or gas turbine articles, that function as an outer wall for the hot gas flow 26 through the turbine section 20. Each seal member 30 is secured to a support 32, which is in turn secured to a case 34 that generally surrounds the turbine section 20. For example, a plurality of the seal members 30 may be arranged circumferentially about the turbine section 20. It is to be understood that the seal member 30 is only one example of an article in the gas turbine engine and that there may be other articles within the gas turbine engine that may benefit from the examples disclosed herein.

Figure 3:
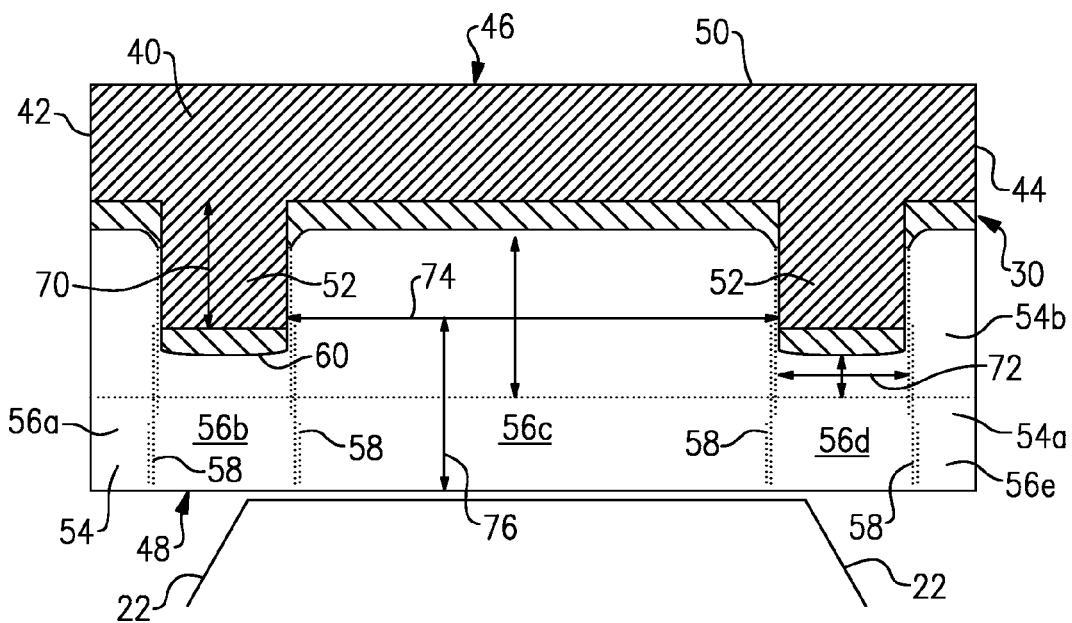
FIG. 3 illustrates an example portion of a turbine article.

FIG. 3 illustrates a portion of the seal member 30 having two circumferential sides 40 (one shown), a leading edge 42, a trailing edge 44, a radially outer side 46, and a radially inner side 48 that is adjacent to the hot gas flow 26. The term "radially" as used in this disclosure relates to the orientation of a particular side with reference to the engine centerline 12 of the gas turbine engine 10.

The seal member 30 includes a substrate 50, a plurality of geometric surface features 52 (hereafter "features") that protrude from the substrate 50 on the gas path side of the seal member 30, and a thermally insulating topcoat 54 (e.g., a thermal barrier) disposed over the plurality of features 52. It is to be understood that the features 52 may not be shown to scale. Moreover, the substrate 50 may include known attachment features for mounting the seal member within the gas turbine engine 10.

As will be described in more detail, the thermally insulating topcoat 54 includes segmented portions 56a-e that are separated by faults 58 extending through the thickness of the thermally insulating topcoat 54 from the plurality of features 52. The faults extend from the edges or sides of the features 52 and facilitate reducing internal stresses within the thermally insulating topcoat 54 that may occur from sintering of the topcoat material at relatively high surface temperatures within the turbine section 20 during use in the gas turbine engine 10. Depending on the composition of the topcoat 54, surface temperatures of about 2500° F. (1370° C.) and higher may cause sintering. The sintering may result in partial melting, densification, and diffusional shrinkage of the thermally insulating topcoat 54 and thereby induce internal stresses. The faults 58 provide pre-existing locations for releasing energy associated with the internal stresses (e.g., reducing shear and radial stresses). That is, the energy associated with the internal stresses may be dissipated in the faults 58 such that there is less energy available for causing delamination cracking between the thermally insulating topcoat 54 and the underlying substrate 50 or bond coat 60 and spallation.

The faults 58 may vary depending upon the process used to deposit the thermally insulating topcoat 54, for instance. As an example, the faults 58 may be gaps between neighboring segmented portions 56a-e. Alternatively, or in addition to gaps, the faults 58 may be considered to be microstructural discontinuities between neighboring segmented portions 56a-e. For instance, the individual segmented portions 56a-e may include a microstructure having a plurality of grains of the material that makes up the thermally insulating topcoat 54 and there may be a fault line discontinuity between neighboring segmented portions 56a-e. Thus, the faults 58 may be considered to be planes of weakness in the thermally insulating topcoat 54 such that the segmented portions 56a-e can thermally expand and contract without producing a significant amount of stress from restriction of a neighboring segmented portion 56a-e and/or any cracking that does occur in the thermally insulating topcoat 54 from internal stresses is dissipated through propagation of the crack along the faults 58. Thus, the faults 58 facilitate dissipation of internal stress energy within the thermally insulating topcoat 54.

The faults 58 may be produced by using any of a variety of different geometric surface features 52. That is, the pattern and shape of the features 52 is not generally limited and may be a grid type of pattern with individual protrusions that extend from the surface of the substrate 50. In any case, the dimensions of each of the plurality of geometric surface features 52 may be designed with a particular ratio of a height 70 of the feature 52 to a width 72 of the feature 52. For instance, the width 72 is selected such that the bond coat 60 (if used) and thermally insulating topcoat 54 can be built-up onto the tops or tips of the feature 52 during the deposition process. Likewise, the height 70 of features 52 is selected such that the portion of the thermally insulating topcoat 54 that builds-up on tops of the features 52 is discontinuous from other portions of the thermally insulating topcoat 54 that build-up in the valleys, or lower recess portion, between the features 52. As will be described with reference to an example fabrication method below, it is this discontinuity or disconnection between the portions of the thermally insulating topcoat 54 on the features 52 and between the features 52 that produces the fault 58 between the segmented portions 56a-e. In comparison, narrow widths of the features in combination with short heights may lead to a continuous over-coating of the thermally insulating topcoat 54 rather than discontinuous portions on the tops of the features 52 and in the valleys.

In some examples, the ratio of the width 72 to the height 70 of the features 52 is 1-10. In further examples, the ratio may be 5 or less, or even 1-3. In some examples, the minimum height is 0.01 inches (0.254 millimeters) to facilitate building-up the thermally insulating topcoat 54 on the tops of the features 52 in a generally uniform thickness.

A spacing 74 between the plurality of geometric surface features 52 may also be selected to facilitate reducing internal stresses of the thermally insulating topcoat 54. As an example, the spacing 74 between the features 52 may be selected with regard to the thickness of the thermally insulating topcoat 54, such as the thickness taken from the top of the features 52 or bond coat 60 to the radially inner side 48, as indicated by arrow 76. In some examples, a ratio of the spacing 74 between the features 52 to the thickness 76 of a thermally insulating topcoat 54 may be 5 or less. The selected spacing 74 may be smaller than a spacing of cracks that would occur naturally, without the faults 58, which makes the thermally insulating topcoat 54 more resistant to spalling and delamination. Thus, different spacings 74 are appropriate for different thicknesses 76 of the thermally insulating topcoat 54.

The material selected for the substrate 50, bond coat 60 (if used), and thermally insulating topcoat 54 are not necessarily limited to any particular kind. For the seal member 30, the substrate 50 may be a metal alloy, such as a nickel based alloy. The bond coat 60 may include any suitable type of bonding material for attaching the thermally insulating topcoat 54 to the substrate 50. In some embodiments, the bond coat 60 includes a nickel alloy, platinum, gold, silver, or MCrAlY where the M includes at least one of nickel, cobalt, iron, or combination thereof, Cr is chromium, Al is aluminum and Y is yttrium. The bond coat 60 may be approximately 0.005 inches thick (approximately 0.127 millimeters), but may be thicker or thinner depending, for example, on the type of material selected and requirements of a particular application.

The thermally insulating topcoat 54 may be any type of ceramic material suited for providing a desired heat resistance in the gas turbine article. As an example, the thermally insulating topcoat 54 may be an abradable coating, such as yttria stabilized with zirconia, hafnia, and/or gadolinia, gadolinia zirconate, molybdate, alumina, or combinations thereof. The topcoats 54 may also include porosity. While various porosities may be selected, typical porosities in a seal application include 5 to 70% by volume. In the illustrated example, the thermally insulating topcoat 54 includes an abradable layer 54a that extends above the geometric surface features 52. In use, the tips of turbine blades 22 may abrade a groove in the abradable layer 54a such that a post-rub layer 54b (separated by the dotted line parallel to the radially inner side 48) remains between the tips of the turbine blades 22 and the bond coat 60 or tops of the geometric surface features 52. The post-rub layer 54b provides thermal protection of the underlying substrate 50 and geometric surface features 52. In this regard, the thicknesses of the abradable layer 54a and post-rub layer 54b may be designed to meet the needs of a particular application. Given this description, one of ordinary skill in the art will recognize other types of ceramic or even metallic materials that could be used for the thermally insulating topcoat 54.

The faults 58 may be formed during fabrication of the thermally insulating topcoat 54. As an example, a thermal spray process may be used to deposit the thermally insulating topcoat 54 onto the substrate 50 and bond coat 60, if used. The bond coat may be deposited using known deposition methods onto portions of the features 52 prior to deposition of the thermally insulating topcoat 54. In this case, the deposition process may be a line-of-sight process such that the sides of the features include less bond coat 60 material or are free of any bond coat 60 material. That is, the bond coat 60 may be discontinuous over the surface of the substrate 50. The bond coat 60 may also be deposited in a thickness that is less than the height 70 of the features 52 to facilitate avoiding bridging of the bond coat 60 over the features 52.

For instance, the thermal spray process may be controlled to deposit the thermally insulating topcoat 54 such that a portion of the thermally insulating topcoat 54 builds-up on the tops of the features 52 with relatively sharp corners that have minimal rounding and another portion of the thermally insulating topcoat 54 builds up in the valleys between the features 52 discontinuously from the portion on top of the features 52 (i.e., no bridging with the topcoat on the features 52). That is, the portion on the tops of the features 52 is not connected to the portion between the features 52. As the build-up of material continues, however, the portion building-up in between the features 52 eventually builds up to the tops of the features 52 such that the portions between the features 52 is laterally adjacent to the portions on the features 52. Because of the discontinuity created by the height and width of the features 52, the continued build-up of the portions on top of the features 52 and between the features 52 forms the faults 58 between the segmented portions 56a-e. Depending on the parameters of the deposition process, the faults 58 may be gaps between neighboring segmented portions 56a-e or discontinuities in microstructure between the neighboring portions. That is, the portions may be so close together that there is little or no gap therebetween except that there is a discontinuous plane or fault line between the segmented portions 56a-e. The radially inner side 48 may thereby be uneven immediately after deposition of the thermally insulating topcoat 54 but may be machined to provide a relatively smooth surface as shown.

In a further example, the process parameters and equipment used in the thermal spray process that may be selected to form the faults 58. For instance, the thermal spray process may utilize a tungsten-lined plasma torch having internal features for facilitating consistent arc root attachment and improved plasma temperature consistency, velocity, particle temperature, and particle trajectory. The nozzle exit diameter may be approximately 0.3125 inches (approximately 8 millimeters), for instance.

Additionally, the plasma spray process may be controlled to project molten droplets of the thermally insulating topcoat 54 material at an angle of 90°+/−5° relative to the top surfaces of the features 52 in order to deposit the thermally insulating topcoat 54 with sharp corners that have minimal rounding and without bridging between the portion of the thermally insulating topcoat 54 that builds-up in the valleys between the features 52 and the portion on top of the features 52. For instance, relative motion between the torch nozzle and the seal member 30 or other type of part may be controlled to maintain the 90°+/−5° angle.

Powder injection into the torch nozzle may also be controlled to achieve a spray plume having a narrow divergence from the 90°+/−5° angle. For instance, the nozzle may include larger powder ports than used in conventional plasma spray processes and a relatively low carrier gas flow rate may be used. The resulting powder injection has increased width across the plasma but a narrow divergence from the 90°+/−5° due to particle size segregation in the direction of injection.

The plasma parameters may also be controlled to achieve desirable particle heating and deposition dynamics and form a strongly bonded thermally insulating topcoat 54. For instance, the plasma parameters may include using 99 standard cubic feet per hour (scfh) of nitrogen, 21 scfh hydrogen, 36 kilowatts at the torch, 12 scfh of carrier gas per port (e.g., nitrogen or argon), two #4 Sulzer Metco powder ports set at 90° relative to each other, and 30 grams per minute of powder per port.

The plurality of geometric surface features 52 may initially be a separate, metal alloy piece that is then attached to the substrate 50, such as in a brazing process. Alternatively, the features 52 may be formed with the substrate 50 as a single, unitary piece, e.g., cast. In any case, the geometric surface features 52 may be selected to be any of a variety of different patterns or shapes. As an example, the features 52 may be formed as hexagonal walls that define a cell structure therebetween. Alternatively, the walls may be other shapes and need not be continuous.

Figure 4:
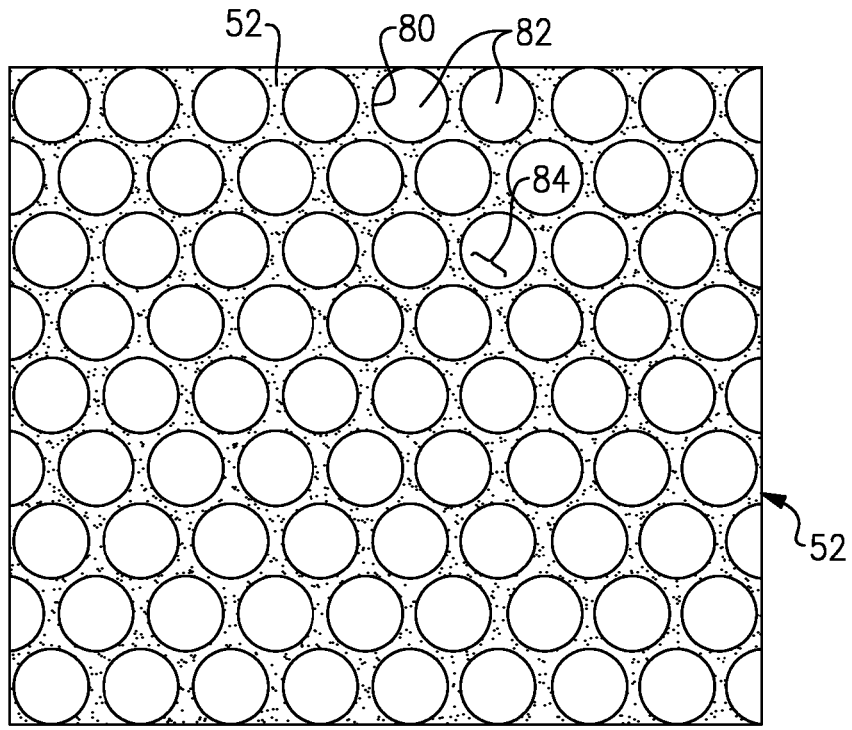
FIG. 4 illustrates an example geometric surface features of the turbine article.

FIG. 4 illustrates an example pattern of the geometric surface features 52 that is constructed in a configuration of a honeycomb having curvilinear walls or sides 80 that form cell structures 82 therebetween. In this case, the curvilinear walls 80 extend from the substrate 50 such that the volume of the cells 82 is cylindrical.

The curvilinear walls 80 in this example are continuously interconnected and form the cells 82 in a hexagonal close packed arrangement. Alternatively, the walls 80 may be provided to make other patterns of the cells 82. Additionally, in the illustrated example, the curvilinear walls 80 have a non-uniform width 84 extending along a length of the wall 80. That is, the wall thickness varies along the length of the wall 80. The variation in the width of the walls 80 provides a natural weak point at the thinnest portion such that if internal stresses build-up within the walls 80, the stresses can be dissipated by crack formation at this thinnest portion.

Figure 5:
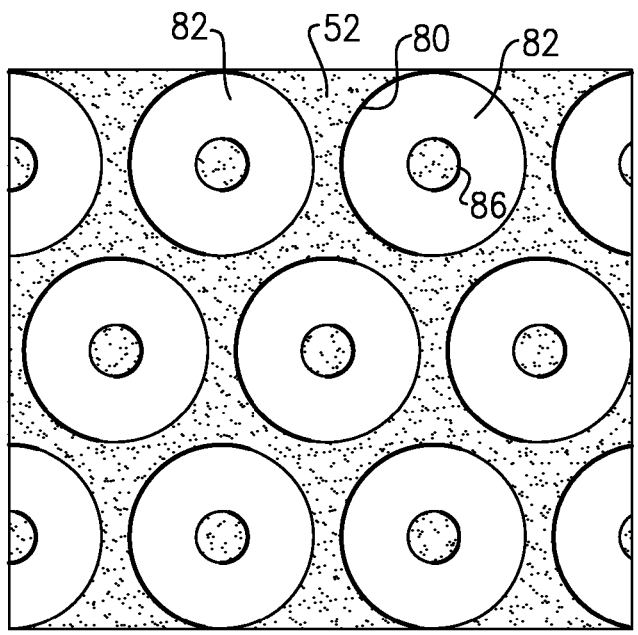
FIG. 5 illustrates another example geometric surface feature of a turbine article.

FIG. 5 illustrates another example pattern of the geometric surface features 52 that also have curvilinear walls 80 and cells 82 defined between the walls 80. In this case, however, each of the cells 82 additionally includes a post 86 that extends upwards from the substrate 50 at least partially through the volume of the cells 82. The posts 86 in this example are generally cylindrical with a circular cross-section. However, other shapes may also be selected, such as but not limited to other geometric shapes. The posts 86 may provide additional faults 58 within the thermally insulating topcoat 54 for a greater degree of segmentation.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A turbine article comprising:
a substrate;
a plurality of solid geometric surface features protruding from the substrate, each of the plurality of geometric features including a substantially uniform protrusion height extending from the substrate and a protrusion width, and a ratio of the protrusion width to the protrusion height is 1-10, with the protrusion height being at least 0.01 inches (0.254 millimeters); and
a thermally insulating topcoat disposed over the plurality of geometric surface features, the thermally insulating topcoat including segmented portions that are separated by faults extending through the thermally insulating topcoat from the plurality of geometric surface features.

2. The turbine article as recited in claim 1, wherein the faults are gaps between the segmented portions.

3. The turbine article as recited in claim 1, wherein the faults are microstructural discontinuities between the segmented portions.

4. The turbine article as recited in claim 1, wherein the faults are planes of weakness between the segmented portions.

5. The turbine article as recited in claim 1, wherein the faults extend from edges of the plurality of geometric surface features.

6. The turbine article as recited in claim 1, wherein the plurality of geometric surface features is a grid having walls defining a cell structure there between.

7. The turbine article as recited in claim 6, wherein the walls include curvilinear sides.

8. The turbine article as recited in claim 6, further including posts that protrude from the substrate within the cell structure.

9. The turbine article as recited in claim 1, wherein the thermally insulating layer includes a porosity of 5-70% by volume.

10. The turbine article as recited in claim 1, wherein the thermally insulating layer comprises a ceramic material.

11. The turbine article as recited in claim 1, wherein the substrate is a first metal alloy, the plurality of geometric surface features are a second metal alloy, and the thermally insulating topcoat is a ceramic material.

12. The turbine article as recited in claim 1, wherein the plurality of geometric surface features include a height extending from the substrate, a width, and a length, and the width is nonuniform along the length.

13. he turbine article as recited in claim 1, including a predetermined spacing between the plurality of geometric surface features, and a ratio of the spacing to the thickness of the thermally insulating topcoat is 5 or less.

14. The turbine article as recited in claim 1, further including a bond coat between portions of the plurality of geometric surface features and the thermally insulating topcoat, with other portions of the plurality of geometric surface features being free of any bond coat.

15. The turbine article as recited in claim 1, wherein the ratio is 5 or less.

16. The turbine article as recited in claim 1, wherein the ratio is 1-3.

17. The turbine article as recited in claim 1, wherein the ratio is 1.

18. The turbine article as recited in claim 1, wherein the plurality of geometric surface features include walls having a top surface and side surfaces, the side surfaces being oriented perpendicular to the substrate.

19. The turbine article as recited in claim 1, wherein the plurality of geometric surface features include continuously connected walls.

20. The turbine article as recited in claim 1, wherein the plurality of geometric surface features is a grid having walls defining a circular cell structure there between, and including posts that protrude from the substrate within the circular cell structure.

21. A turbine comprising:
a compressor section;
a combustor fluidly connected with the compressor section; and
a turbine section downstream from the combustor, the turbine section having a seal that includes a substrate extending between two circumferential sides, a leading edge, a trailing edge, an inner side for resisting hot engine exhaust gases from the combustor, and an outer side, with a plurality of solid geometric surface features protruding from the inner side and a thermally insulating topcoat disposed over the plurality of geometric surface features, each of the plurality of geometric features including a substantially uniform protrusion height extending from the substrate and a protrusion width, and a ratio of the protrusion width to the protrusion height is 1-10, with the protrusion height being at least 0.01 inches (0.254 millimeters), the thermally insulating topcoat including segmented portions that are separated by faults extending through the thermally insulating topcoat from the plurality of geometric surface features.

22. A method of processing a gas turbine article, comprising:
depositing a thermally insulating topcoat over a plurality of solid geometric surface features that protrude from a substrate such that the thermally insulating topcoat forms with faults that extend through the thermally insulating topcoat from the plurality of geometric surface features to separate segmented portions of the thermally insulating topcoat, each of the plurality of geometric features including a substantially uniform protrusion height extending from the substrate and a protrusion width, and a ratio of the protrusion width to the protrusion height is 1-10, with the protrusion height being at least 0.01 inches (0.254 millimeters).

23. The method as recited in claim 22, including depositing the thermally insulating topcoat such that portions of the thermally insulating topcoat build up on top of the plurality of geometric surface features discontinuously from other portions of a thermally insulating topcoat that build up between the plurality of geometric surface features.

24. The method as recited in claim 22, including depositing the thermally insulating topcoat using a thermal spray process.

25. The method as recited in claim 24, including depositing the thermally insulating topcoat at an angle of 90° +/−5° relative to a top surface of the plurality of geometric surface features.

* * * * *